United States Patent
Bell et al.

[11] Patent Number: 6,126,200
[45] Date of Patent: *Oct. 3, 2000

[54] BUCKLE ARRANGEMENT

[75] Inventors: John Bell; Frederic Jallot; Paul Slack, all of Carlisle, United Kingdom

[73] Assignee: Breed Automotive Technology, Inc., Lakeland, Fla.

[*] Notice: This patent issued on a continued prosecution application filed under 37 CFR 1.53(d), and is subject to the twenty year patent term provisions of 35 U.S.C. 154(a)(2).

[21] Appl. No.: 09/212,754

[22] Filed: Dec. 16, 1998

[30] Foreign Application Priority Data

Dec. 19, 1997 [GB] United Kingdom ................ 97 26 938

[51] Int. Cl.$^7$ ................................................ B60R 22/00
[52] U.S. Cl. ........................................................ 280/801.1
[58] Field of Search ............................. 280/801.1, 801.2, 280/808; 297/468, 464, 483

[56] References Cited

U.S. PATENT DOCUMENTS 4,718,969  1/1988  Koide et al. ......................... 280/801.1
4,915,451  4/1990  Forget et al. ........................ 280/801.1

FOREIGN PATENT DOCUMENTS 1481964  2/1970  Germany .

*Primary Examiner*—Eric Culbreth
*Attorney, Agent, or Firm*—Lonnie R. Drayer; Beth A. Vrioni

[57] ABSTRACT

A rear seat vehicle seat belt buckle arrangement includes a buckle head and webbing for attaching the buckle head to a load bearing part of the vehicle. The webbing is fixed to at least two spaced apart attachment locations connected to the load bearing part of the vehicle. The webbing may be a single piece of webbing looped through a slot in the buckle head or two separate lengths of webbing and it may be attached to opposite or to spaced apart rings mounted to a mounting bracket bolted to a fixed part of the vehicle (e.g. a floor plate). The fixing bolt preferably passes between the two splayed parts of the webbing to retain the splayed form. This provides more comfort to the passenger and more flexibility whilst optimizing the safety of the restraint by restricting forward movement of the passenger in a crash and applying crash leads appropriately.

14 Claims, 1 Drawing Sheet

BUCKLE ARRANGEMENT

FIELD OF THE INVENTION

This invention relates to a buckle arrangement, and in particular relates to an arrangement for mounting a buckle for a vehicle safety restraint for rear passenger seats.

BACKGROUND OF THE INVENTION

Buckles for receiving the engagement member of a rear safety restraint are usually required to be flexible in all directions. This ensures comfort for the rear seat passenger, regardless of his position on the rear seat, whilst allowing the rear seat to be folded easily, for example to expand the rear load area of a car. Further-more, it is necessary to ensure suitable application of the load on the restraint under vehicle deceleration regardless of the size, weight or position of the passenger.

A common solution is to attach the buckle to the vehicle floor panel using a length of flexible webbing, for example similar to that used to provide the safety restraint strap. Such webbing is usually secured to the floor panel by a mounting bracket bolted onto the panel. This is usually positioned close to the required location of the buckle. However, the length of webbing between the buckle and the bracket must be sufficient to allow for a strong enough stitching pattern where the ends of the webbing overlap and are to be secured together. Also, the length of webbing must provide enough flexibility to accommodate various shapes and sizes of passenger and to allow for the rear seat to be folded. This leads to an undesirably long length of webbing which allows a large distance of travel of the buckle in the forward direction before bearing the load of the safety restraint. Consequently, undesirable forward movement of the occupant occurs. A ring on the mounting bracket for the buckle webbing may be offset in a forward direction from the required position of the buckle, but in order to provide the required length of webbing between the ring and the buckle, the problem of unrestrained movement remains. Further-more it may be possible for the ring to be felt through the seat by the passenger, which is evidently detrimental to the comfort of the passenger.

It is also known to alleviate this problem by running the length of webbing from a ring at the rear of the bracket underneath the body of the bracket. Whilst this removes the problem of forward movement of the buckle, the bracket bolt must now pass through the webbing, such that the webbing is effectively locked by the bolt and the load is applied to only half of the webbing length, thus correspondingly reducing the strength of the assembly.

SUMMARY OF THE INVENTION

According to the present invention, there is provided a buckle head, and flexible means for attaching the buckle head to a load bearing part of the vehicle, the flexible means being fixed to at least two spaced apart attachment locations connected to the load bearing part of the vehicle. This arrangement allows the buckle to be flexible in all directions, whilst the control of forward movement is improved since there is less slack in the arrangement. Lengths of webbing extending from the spaced locations may still be sufficiently long to accommodate the required stitch pattern, since the attachment points are offset.

Since the buckle in use is now held at three points (the two spaced locations and the tongue of the restraint strap), oscillations of the buckle during impact are reduced. This reduces the risk of the buckle hitting something in the car, or being accidentally released.

Furthermore, since the load is shared between the two attachment points, it is possible to use a narrower webbing and a correspondingly smaller ring on the bracket.

Preferably, the flexible means comprises a single length of webbing passing through an aperture in the buckle head. Thus the buckle head may slide along the webbing such that the length of webbing between the buckle head and each attachment point is automatically adjusted to share the load.

DETAILED DESCRIPTION OF THE DRAWINGS

Figure 1:
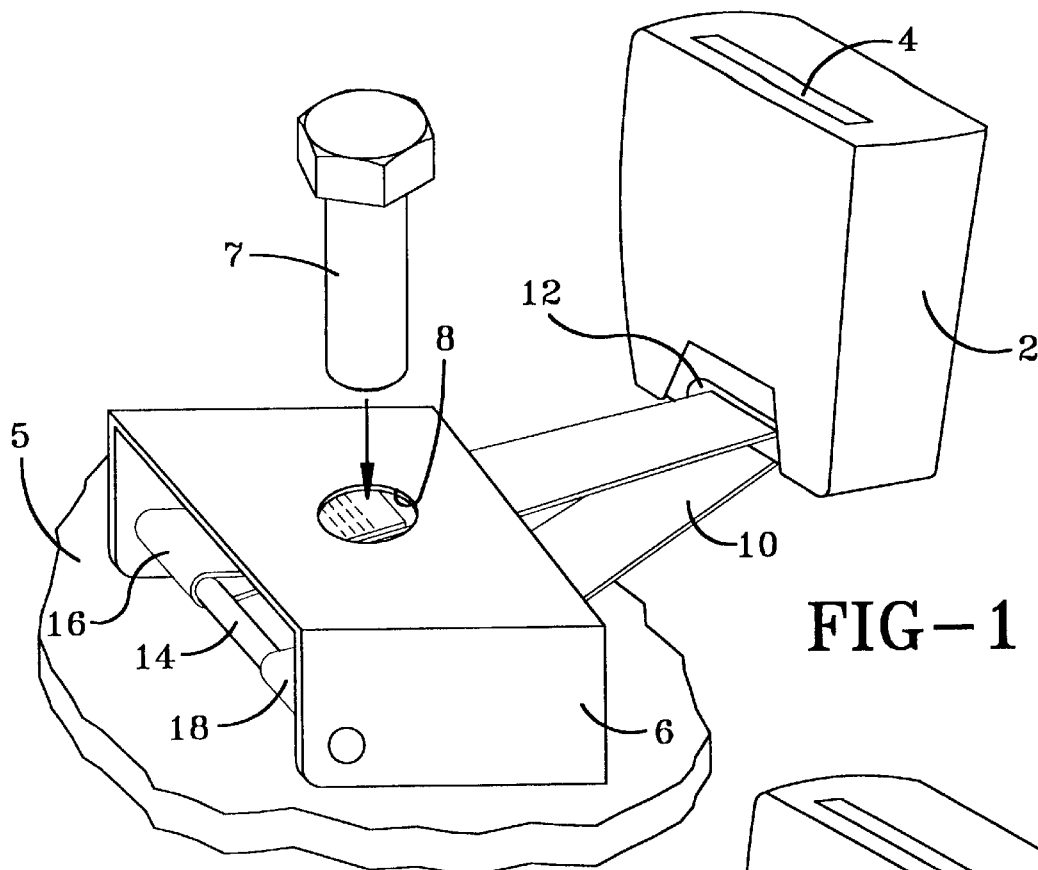
FIG. 1 is a schematic perspective view of a buckle arrangement according to one embodiment of the invention.

Referring firstly to FIG. 1, a buckle head 2 for a safety restraint has an aperture 4 for receiving a cooperating member or tongue on the end of the safety restraint strap. A mounting bracket 6 is arranged to be attached to a fixed part of a vehicle, such as the floor panel schematically shown at 5, by means of a bolt 7 schematically shown at. A bore 8 is provided in the center of the bracket 6 for receiving the bolt 7 schematically shown at. A length of flexible webbing 10 extends between the buckle head 2 and the bracket 6. The webbing 10 passes through an aperture 12 in the buckle head 2 and is secured to the mounting bracket 6 at either end by passing around a bar 14 on the bracket 6. The free ends of the length of webbing 10 are each securely stitched back onto the adjacent webbing to form a closed loop 16, 18 around the bar 14. The loops 16, 18 are positioned at either end of the mounting bar 14, such that the webbing 10, in use, passes on either side of the bolt 7 schematically shown at. The bolt therefore serves to retain the loops 16, 18 of the webbing 10 at spaced locations on the bar 14.

Figure 2:
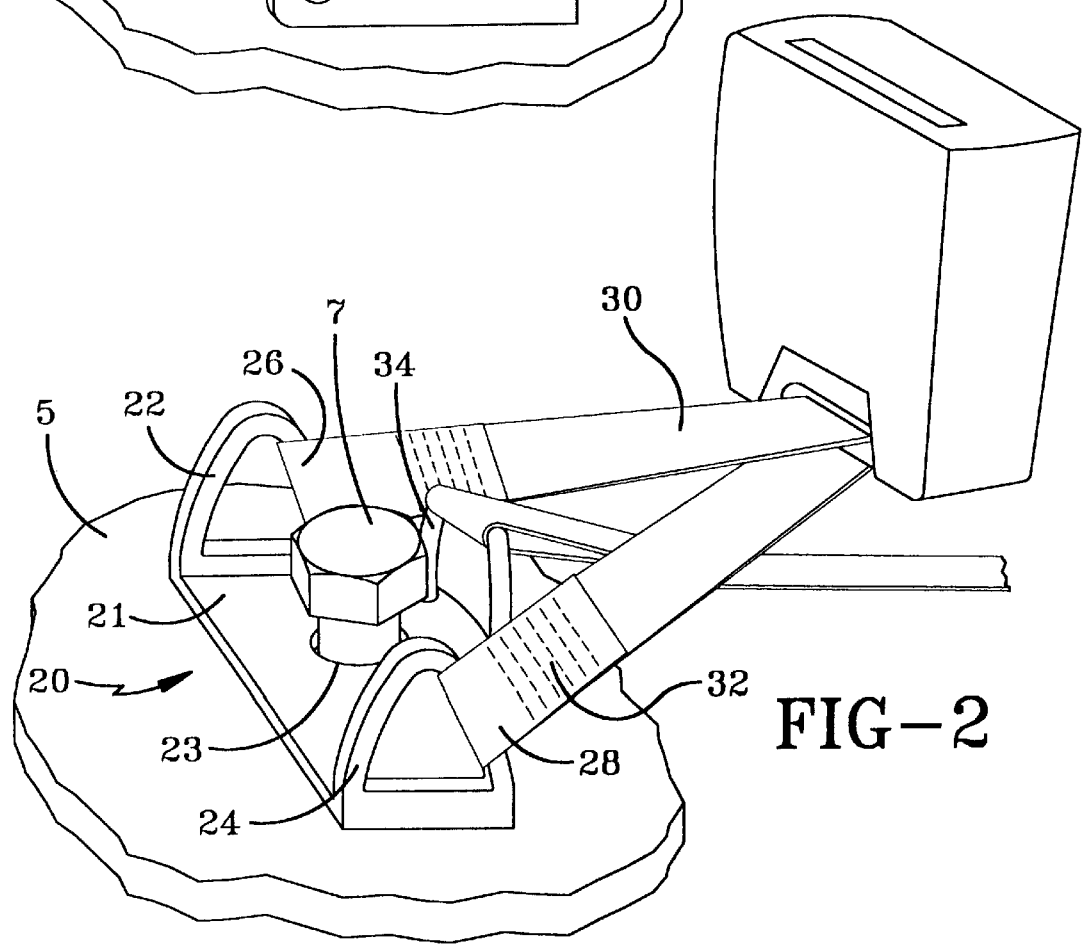
FIG. 2 is a schematic perspective view of a buckle arrangement according to another embodiment of the invention.

Referring now to FIG. 2, in this alternative embodiment, the mounting bracket 20 has a pair of opposed rings 22, 24 for securing each end 26, 28 of the webbing 30 at spaced locations on either side of a central plate 21 of the bracket 20. A bore 23 is provided for receiving a bolt 7 schematically shown at, as before.

The mounting bracket 20 also includes an additional ring 34 which may be used to attach webbing for a second buckle head (not shown).

As can be seen more clearly from FIG. 2, the arrangement according to the invention allows an adequate length of webbing for providing the required stitch pattern 32 necessary for properly securing the ends of the webbing.

It would also be possible, according to the invention, to provide two separate pieces of webbing extending from the bar 14 or the rings 22, 24 to the buckle aperture 12. In this case, each piece should be adjusted to a suitable length.

What is claimed is:

1. A buckle arrangement for a vehicle safety restraint comprising a single buckle head;

a single mounting bracket attached to a load bearing part of a vehicle, said mounting bracket having at least two spaced apart attachment locations; and a length of webbing for attaching the buckle head to the mounting bracket, said single mounting bracket having a bar around which are secured respective ends of the webbing at the spaced locations.

2. A buckle arrangement according to claim 1 wherein the webbing passes through an aperture attached to the buckle head so that the buckle head is slidable along the webbing.

3. A buckle arrangement according to claim 1 wherein the load bearing part of the vehicle comprises a floor panel.

4. A buckle arrangement according to claim 1, wherein the ends of the length of webbing are secured in a closed loop around the bar and stitched into closed loops.

5. A buckle arrangement according to claim 1, wherein the mounting bracket further comprises a bore.

6. A buckle arrangement according to claim 5, wherein the mounting bracket further comprises a bolt, wherein said bolt fits into the bore and into the load bearing part of the vehicle.

7. A buckle arrangement according to claim 6 wherein the webbing, in use, passes on either side of the bolt serves to retain the respective ends of the webbing at the respective spaced locations on the bar.

8. A buckle arrangement for a vehicle safety restraint comprising a single buckle head;
 a single mounting bracket attached to a load bearing part of a vehicle, said mounting bracket having at least two spaced apart attachment locations; and
 a length of webbing for attaching the buckle head to the mounting bracket, said mounting bracket having two spaced rings for securing respective ends of the length of webbing at the spaced locations.

9. A buckle arrangement according to claim 8 wherein the mounting bracket further comprises an additional ring for attaching webbing for a second buckle head.

10. A buckle arrangement according to claim 8 wherein the webbing passes through an aperture attached to the buckle head so that the buckle head is slidable along the webbing.

11. A buckle arrangement according to claim 8, wherein the mounting bracket further comprises a bore.

12. A buckle arrangement according to claim 11, wherein the mounting bracket further comprises a bolt, wherein said bolt fits into the bore and into the load bearing part of the vehicle.

13. A buckle arrangement according to claim 8, wherein the ends of the length of webbing are secured in a closed loop around the ring and stitched into closed loops.

14. A buckle arrangement according to claim 8, wherein the load bearing part of the vehicle comprises a floor panel.

\* \* \* \* \*